United States Patent
Chu

(10) Patent No.: US 9,618,807 B2
(45) Date of Patent: Apr. 11, 2017

(54) DEVICES AND METHODS TO COMPENSATE FOR IMAGE COLOR VARIANCE DUE TO DISPLAY TEMPERATURES

(75) Inventor: Chia-Ching Chu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 522 days.

(21) Appl. No.: 13/603,134

(22) Filed: Sep. 4, 2012

(65) Prior Publication Data

US 2014/0063422 A1 Mar. 6, 2014

(51) Int. Cl.
*G02F 1/1343* (2006.01)
*G02F 1/1335* (2006.01)

(52) U.S. Cl.
CPC .. *G02F 1/134336* (2013.01); *G02F 1/133609* (2013.01); *G02F 2201/52* (2013.01); *G09G 2300/0452* (2013.01); *G09G 2320/0242* (2013.01); *G09G 2320/0666* (2013.01); *Y10T 29/49002* (2015.01)

(58) Field of Classification Search
CPC ......... G02F 1/133514; G02F 1/133512; G02F 2001/136222; G02F 2201/52; G02F 2001/134345; G02F 1/134309; G02F 2201/40; G02F 1/133382; G02F 1/132; G02F 2001/136218; G02F 2203/30; G02F 2203/34; G02F 2001/133622; G02F 1/133609; G02F 2001/133391; G02F 1/23; G02F 2203/21; G02F 1/134336; G02F 1/136209; G02F 1/134366; G02F 2001/13622; G02F 2201/36; G09G 2360/16; G09G 2320/0276; G09G 2320/0626; G09G 2320/0233; G09G 3/3607; G09G 2320/0666; G09G 2320/041; G09G 2300/0452; G09G 2320/0242; G09G 3/2074; G09G 2300/0465; G09G 2320/0686; G09G 3/207; G09G 2310/0465; G09G 3/3603; G09G 3/2077;
(Continued)

(56) References Cited

U.S. PATENT DOCUMENTS 5,899,550 A * 5/1999 Masaki ............. G02F 1/133514
349/106
7,710,388 B2 5/2010 Hirata et al.
(Continued)

OTHER PUBLICATIONS

Definition of "offset," Oxford Dictionaries (on-line), downloaded from www.oxforddictionaries.com on Apr. 21, 2015.*

*Primary Examiner* — Paisley L Arendt
*Assistant Examiner* — Angela Davison
(74) *Attorney, Agent, or Firm* — Fletcher Yoder PC

(57) ABSTRACT

Methods and devices to compensate for image color variance due to display temperatures are provided. In one example, a display of an electronic device may include a first pixel section that has multiple pixels. The pixels may include a red subpixel, green subpixel, and blue subpixel that each has a respective aperture ratio. The display may also include a second pixel section that has multiple pixels. Again, the pixels may include a red subpixel, green subpixel, and blue subpixel that each has a respective aperture ratio. One or more of the subpixel aperture ratios of the first pixel section may be greater than a respective one or more of the subpixel aperture ratios of the second section to overcome image color variance that may exist due to temperature variations of the display.

16 Claims, 7 Drawing Sheets

(58) Field of Classification Search
CPC ... G09G 2300/0439; G09G 2300/0469; G09G 2300/0478; G09G 2320/00; Y10T 29/49002
USPC .............. 349/20, 72, 85, 106, 114, 145, 111, 349/108–110, 115; 345/63, 72, 83, 101, 345/690, 695, 88–90; 348/761, 791
See application file for complete search history.

(56) References Cited

U.S. PATENT DOCUMENTS

| | | |
|---|---|---|
| 8,110,978 B2 | 2/2012 | Fukuda |
| 2006/0139952 A1* | 6/2006 | Inoue et al. ................. 362/613 |
| 2008/0129929 A1 | 6/2008 | Miyachi et al. |
| 2010/0060822 A1 | 3/2010 | Sun |
| 2011/0153284 A1 | 6/2011 | Li et al. |

* cited by examiner

DEVICES AND METHODS TO COMPENSATE FOR IMAGE COLOR VARIANCE DUE TO DISPLAY TEMPERATURES

BACKGROUND

The present disclosure relates generally to electronic displays and, more particularly, to devices and methods to compensate for image color variance due to display temperatures.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Displays, such as liquid crystal displays (LCDs) and organic light emitting diode (OLED) displays, are commonly used in a wide variety of electronic devices, including such consumer electronics as televisions, computers, and handheld devices (e.g., cellular telephones, audio and video players, gaming systems, and so forth). Such displays typically provide a display in a relatively thin package that is suitable for use in a variety of electronic goods.

As may be appreciated, the thermal distribution of a display of an electronic device may be non-uniform. For example, certain portions of the display may be positioned near heat producing components of the electronic device (e.g., processors, power supplies, batteries, integrated circuits, etc.) and such portions of the display may be exposed to greater heat than other portions of the display. As the thermal distribution of the display varies between portions of the display, the thermal distribution may affect an image color shown on the display so that the image color varies between such portions. For example, a central portion of the display may display white properly, while a border (e.g., edge) portion of the display positioned near heat producing components of the electronic device may undesirably display the white with a color tint (e.g., yellow, blue, red, etc.).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods to compensate for image color variance due to display temperatures. By way of example, a display of an electronic device may include a first pixel section that has multiple pixels. The pixels may include a red subpixel, green subpixel, and blue subpixel that each has a respective aperture ratio. The display may also include a second pixel section that has multiple pixels. Again, the pixels may include a red subpixel, green subpixel, and blue subpixel that each has a respective aperture ratio. One or more of the subpixel aperture ratios of the first pixel section may be greater than a respective one or more of the subpixel aperture ratios of the second section to overcome image color variance that may exist due to temperature variations of the display.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to electronic displays of electronic devices having pixels with different aperture ratios to compensate for temperature variations of the display. For example, the display may store data on pixels to make the whole display white. The color of white shown on the display may not appear to be uniform across the whole display because of temperature variations caused by heat generating components (e.g., the center of the display may appear true white while the borders of the display may appear to be white tinted with another color such as blue, yellow, or red, for example). To provide a more uniform color distribution, the aperture ratios of pixels being affected by higher temperatures may be reduced. Specifically, aperture ratios of red subpixels, green subpixels, blue subpixels, and/or white subpixels of affected pixels may be reduced to block colors other than white from appearing when the pixels are supposed to display white.

Figure 1:
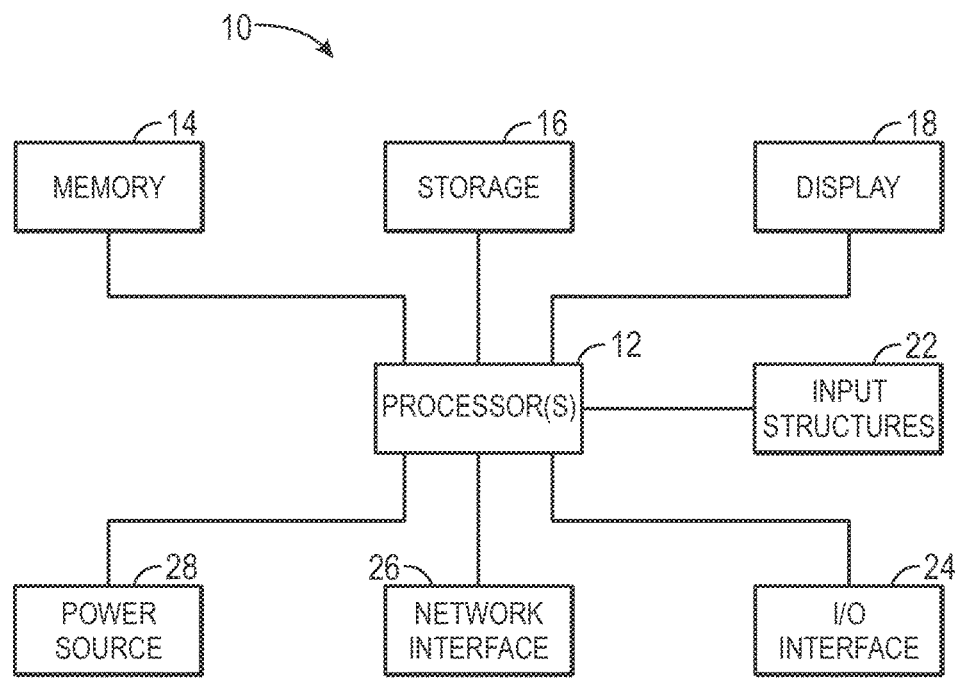
FIG. 1 is a schematic block diagram of an electronic device with an electronic display having pixels with different aperture ratios to compensate for temperature variations in the display, in accordance with an embodiment.
Figure 2:
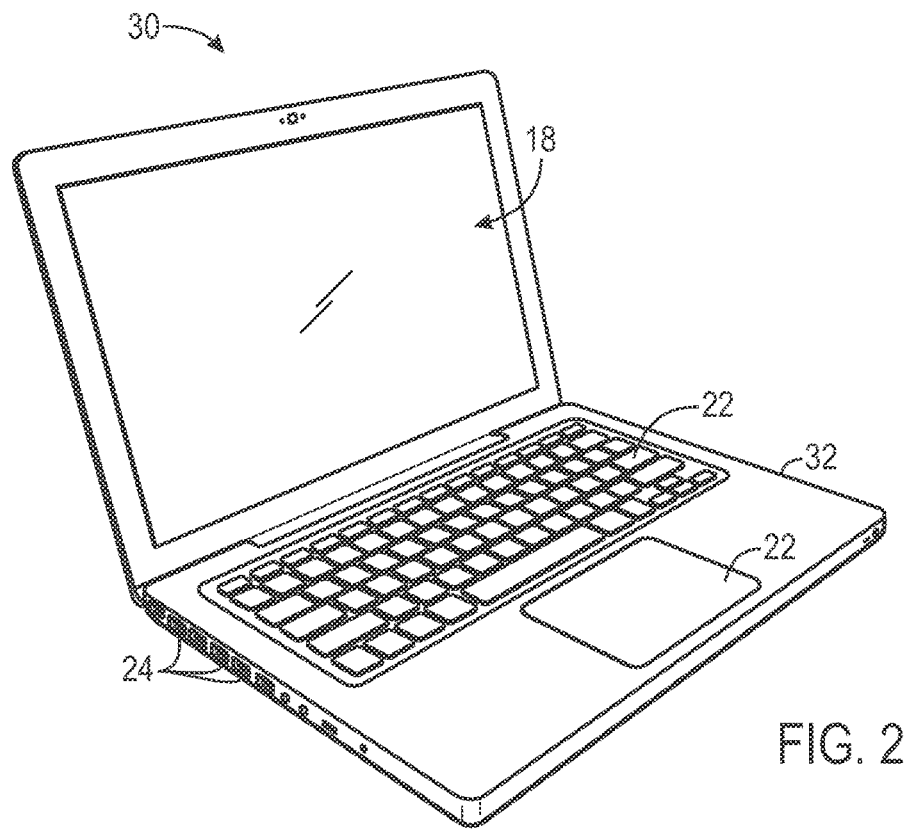
FIG. 2 is a perspective view of a notebook computer representing an embodiment of the electronic device of FIG. 1.
Figure 3:
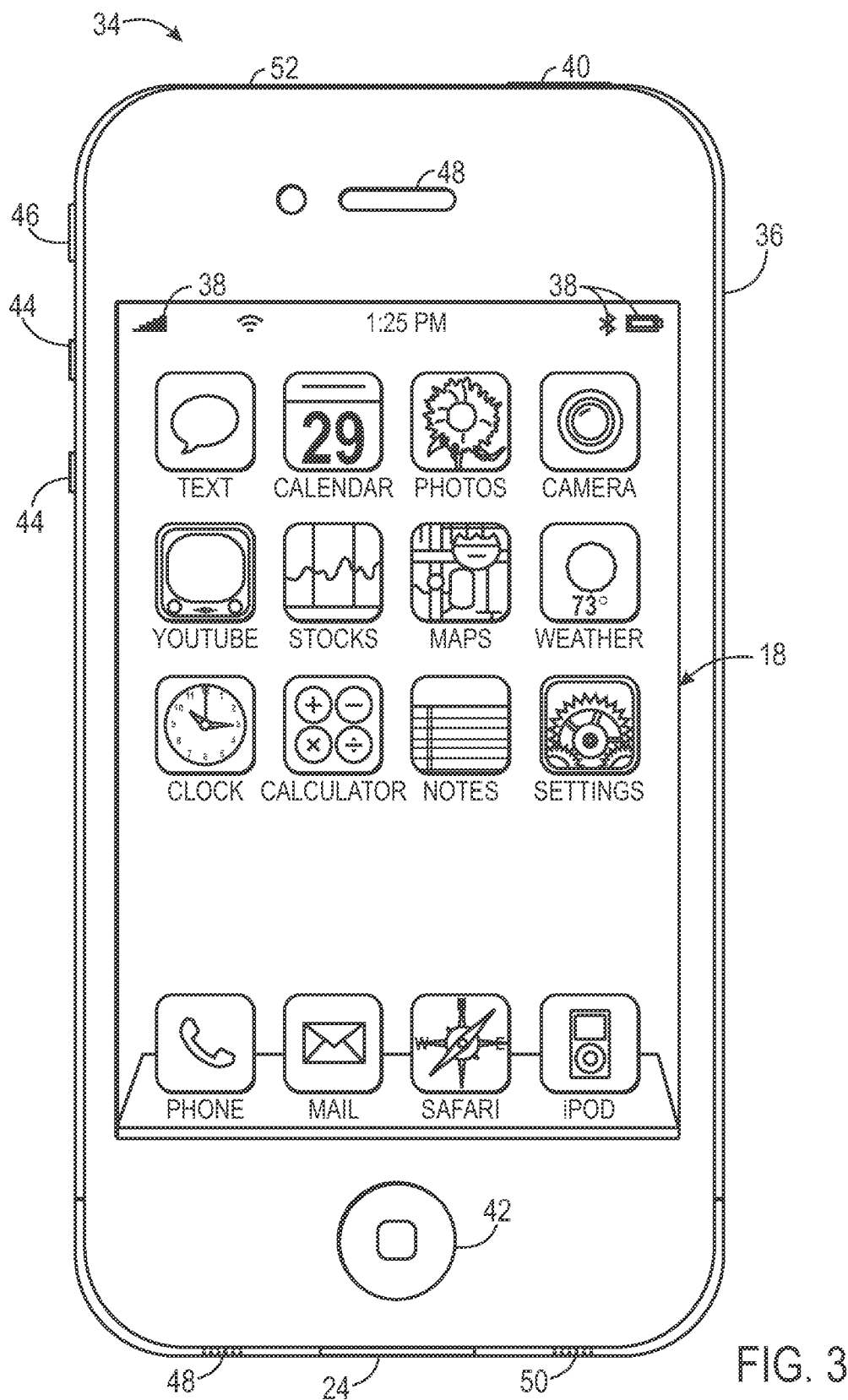
FIG. 3 is a front view of a handheld device representing another embodiment of the electronic device of FIG. 1.

With the foregoing in mind, a general description of suitable electronic devices that may employ a display having pixels with different pixel aperture ratios will be provided below. In particular, FIG. 1 is a block diagram depicting various components that may be present in an electronic device suitable for incorporating such a display. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As may be appreciated, the display 18 may include pixels that have different pixel aperture ratios. As such, embodiments of the present disclosure may be employed to reduce image color variations from occurring on the display 18.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the electronic display 18.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once. The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on the computer 30. For example, a keyboard and/or touchpad may allow a user to navigate a user interface or application interface displayed on the display 18. Further, the display 18 of the computer 30 may include pixels having different aperture ratios to compensate for temperature variations of the display 18.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 (e.g., housing) to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 of the handheld device 34 may include pixels having different pixel aperture ratios so that portions of the display 18 that experience higher temperatures may be able to display colors the same way that portions of the display 18 that do not experience higher temperatures display colors.

Figure 4:
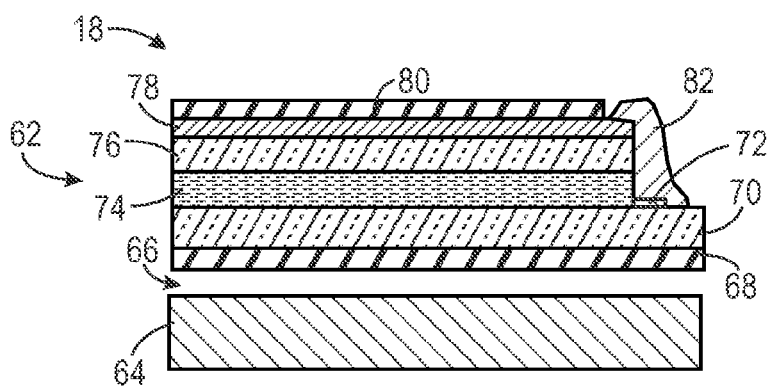
FIG. 4 is a cross-sectional view of layers of a display panel of an electronic display that may be used to form pixels having different aperture ratios, in accordance with an embodiment.

Different pixel aperture ratios may be formed by one or more layers of the display 18 of the electronic device 10. FIG. 4 illustrates an embodiment of one or more layers of the display 18 that may be used to form the different pixel aperture ratios. As illustrated, the display 18 includes a display panel 62 positioned over a backlight assembly 64. The display panel 62 includes multiple layers that form pixels of the display 18. The backlight assembly 64 directs light through the pixels of the display panel 62 via a transparent medium 66 (e.g., gas, fluid, etc.) between the backlight assembly 64 and the display panel 62.

As illustrated, the display panel 62 includes a rear polarizer 68 positioned adjacent to the backlight assembly 64. The rear polarizer 68 (e.g., polarizing layer) polarizes light emitted by the backlight assembly 64. Moreover, a thin film transistor (TFT) layer 70 is formed over the rear polarizer 68. For simplicity, the TFT layer 70 is depicted as a generalized structure in FIG. 4. In practice, the TFT layer 70 may itself include various conductive, non-conductive, and semiconductive layers and structures that generally form the electrical devices and pathways that drive the operation of the pixels. In certain embodiments, the TFT layer 70 may be formed to use fringe field switching (FFS) or in-plane switching (IPS). As illustrated, a grounding layer 72 is formed over the TFT layer 70. The grounding layer 72 may be used to ground portions of the display panel 62. As such, the grounding layer 72 may be coupled to a reference signal of the display panel 62, the display 18, and/or the electronic device 10. In some embodiments, the grounding layer 72 may be formed as part of the TFT layer 70. As may be appreciated, the TFT layer 70 may also include a substrate layer (e.g., formed from a light-transparent material, such as glass, quartz, and/or plastic) at the interface with the rear polarizer 68 and an alignment layer (e.g., formed from polyimide or other suitable materials) at the interface with a liquid crystal layer 74.

The liquid crystal layer 74 includes liquid crystal particles or molecules suspended in a fluid or gel matrix. The liquid crystal particles may be oriented or aligned with respect to an electrical field generated by the TFT layer 70. The orientation of the liquid crystal particles in the liquid crystal layer 74 determines an amount of light transmission through pixels of the display panel 62. Thus, by modulation of the electrical field applied to the liquid crystal layer 74, the amount of light transmitted though the pixels may be correspondingly modulated.

Disposed over the liquid crystal layer 74 is a color filter layer 76. As may be appreciated, the color filter layer 76 may include one or more alignment and/or overcoating layers interfacing the liquid crystal layer 74 with the color filter layer 76. In addition, the color filter layer 76 may include a black mask portion for blocking light transmission therethrough. Furthermore, the color filter layer 76 may include a red, green, or blue filter, for example. Thus, each pixel of the display panel 62 may correspond to a primary color when light is transmitted from the backlight assembly 64 through the liquid crystal layer 74 and the color filter layer 76. It should be noted that the color filter layer 76 may include a substrate (e.g., formed from light-transmissive glass, quartz, and/or plastic).

A shielding layer 78 is disposed over the color filter layer 76 and between the color filter layer 76 and a front polarizer 80 (e.g., a polarizing layer to polarize light emitted by the backlight assembly 64). Furthermore, the shielding layer 78 may be formed from any suitable material. For example, the shielding layer 78 may be formed from a material such as indium tin oxide (ITO) and/or indium zinc oxide (IZO).

The shielding layer 78 is electrically coupled to the grounding layer 72 via a conductor 82 to direct static charges from the shielding layer 78 to the grounding layer 72. The conductor 82 may be formed from any suitable conductive material (e.g., silver, silver paste, copper, conductive tape, and so forth) to electrically couple the shielding layer 78 to the grounding layer 72. It should be noted that the pixel aperture ratios may be formed (e.g., determined) by one or more layers of the display 18 such as the TFT layer 70, the liquid crystal layer 74, the color filter layer 76, the shielding layer 78, and/or the front polarizer 80.

Figure 5:
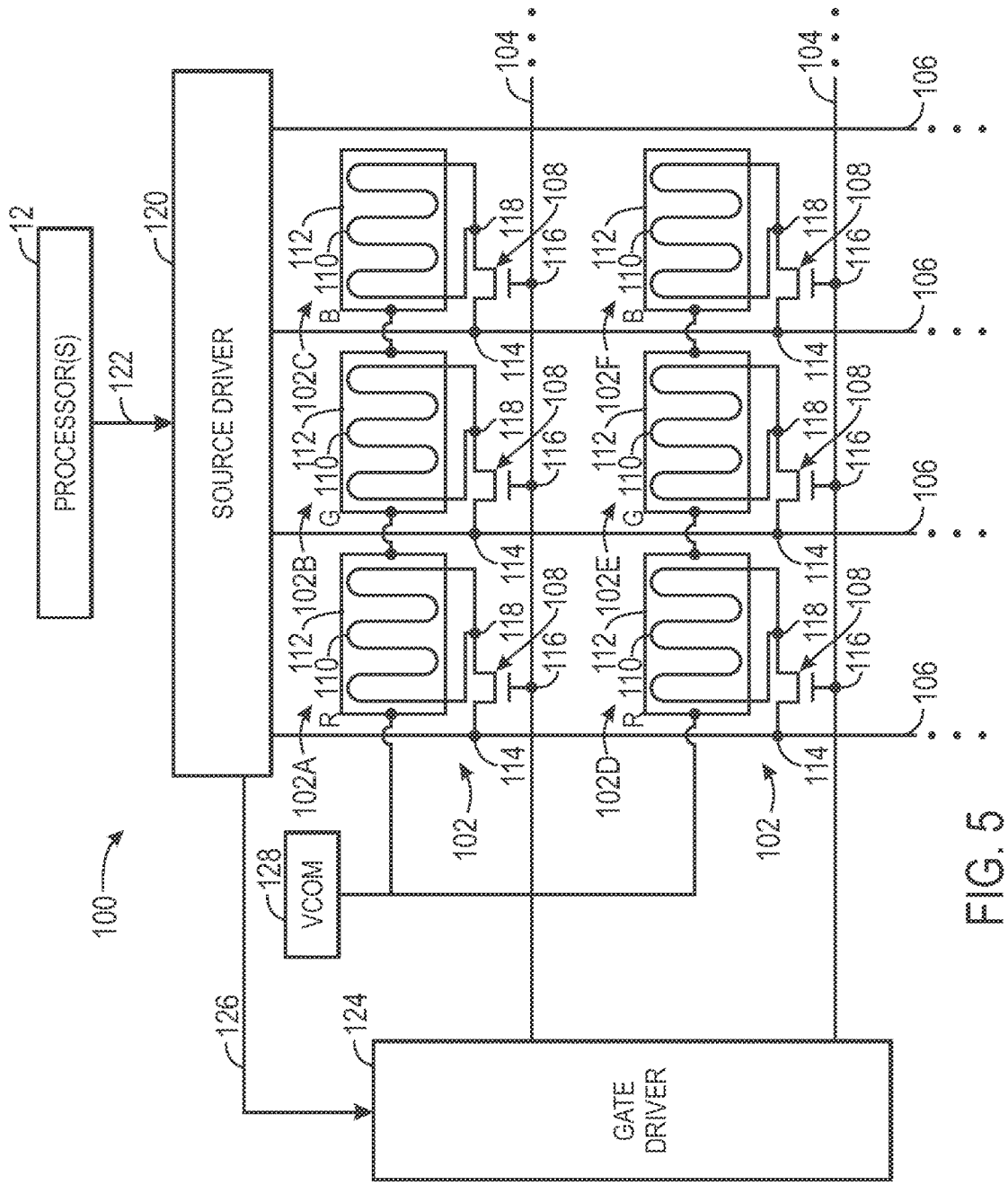
FIG. 5 is a circuit diagram illustrating display circuitry used with pixels having different aperture ratios, in accordance with an embodiment.

Among the various components of the electronic display 18 may be a pixel array 100, as shown in FIG. 5. As illustrated, FIG. 5 generally represents a circuit diagram of certain components of the display 18 in accordance with an embodiment. In particular, the pixel array 100 of the display 18 may include a number of pixels 102 disposed in a pixel array or matrix. In such an array, each pixel 102 may include a combination of three subpixels (e.g., red, green, blue) that respectively filter only one color of light. For example, reference numbers 102A-102C represent three subpixels that form one pixel 102. As another example, reference numbers 102D-102F represent three subpixels that form one pixel 102. In some embodiments, each pixel 102 may include a combination of four subpixels (e.g., red, green, blue, white). Furthermore, each subpixel may be defined by the intersection of rows and columns, represented by gate lines 104 (also referred to as scanning lines), and source lines 106 (also referred to as data lines), respectively. Although only two pixels 102 are shown for purposes of simplicity, it should be understood that in an actual implementation, the display 18 may include hundreds or thousands of such pixels 102. For purposes of the present disclosure, the term "subpixel" is intended to be a portion of a "pixel."

In the presently illustrated embodiment, each pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In the depicted embodiment of FIG. 5, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned on and off) for a period of time based on the respective presence or absence of a scanning or activation signal on the gate lines 104 that are applied to the gates 116 of the TFTs 108.

When activated, a TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 122 from the processor(s) 12 and sending corresponding image signals to the pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120.

The source driver 120 also may couple to a gate driver integrated circuit (IC) 124 that may activate or deactivate rows of pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The display 18 may include a Vcom source 128 to provide a VCOM output to the common electrodes 112. In some embodiments, the Vcom source 128 may supply a different VCOM to different common electrodes 112 at different times. In other embodiments, the common electrodes 112 all may be maintained at the same potential (e.g., a ground potential) while the display 18 is on.

Figure 6:
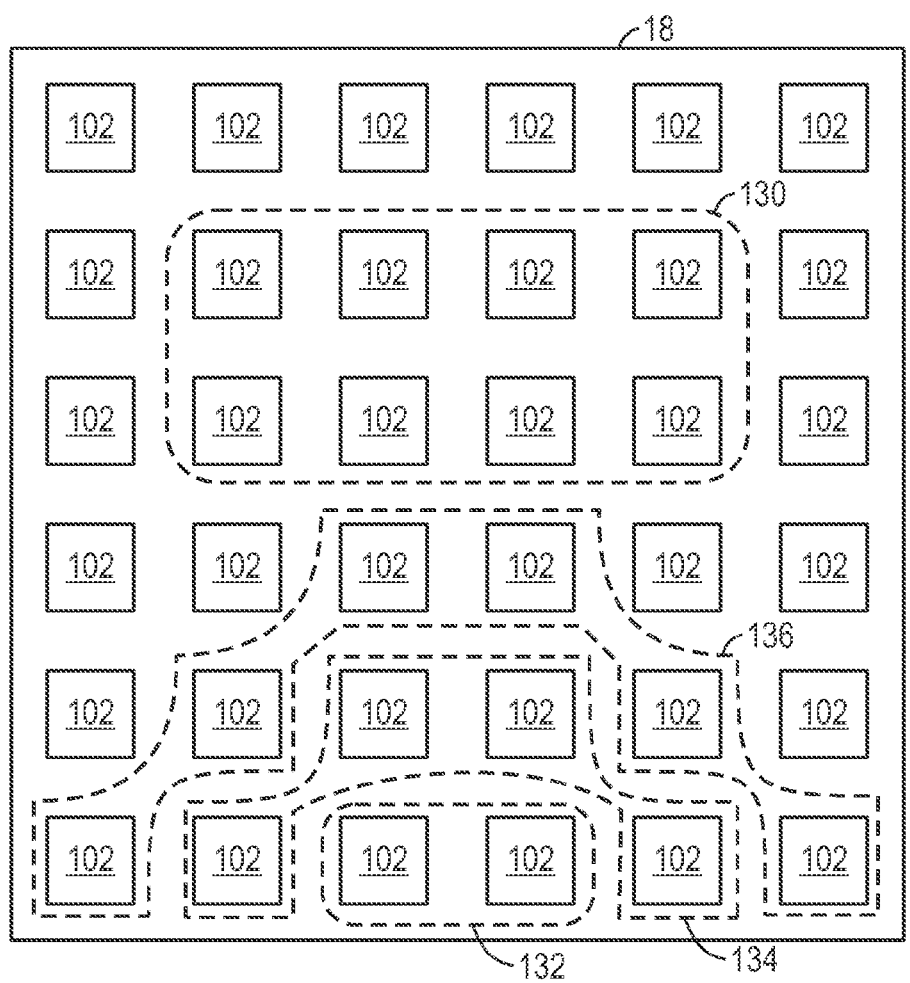
FIG. 6 is a top view of a display having pixels with different aperture ratios, in accordance with an embodiment.

As discussed above, certain portions of the display 18 may be exposed to higher temperatures than other portions of the display 18. Accordingly, FIG. 6 is a top view of a display 18 having pixels 102 illustrating one embodiment of sections of the display 18 that may be exposed to different temperatures. Accordingly, each section of the display 18 may have pixels 102 configured with different aperture ratios in relation to other sections of the display 18. Specifically, the display 18 includes a central portion 130 having pixels 102. The central portion 130 of the display 18 may be minimally exposed to heat producing components of the electronic device 10. Accordingly, the pixels 102 in the central portion 130 may have aperture ratios that are maximized to achieve the highest intensity possible.

In contrast, other portions 132, 134, and 136 of the display 18 may be exposed to heat producing components of the electronic device 10. As may be appreciated, without adjusting aperture ratios, the display 18 may show color tints in areas of the display 18 that are exposed to higher temperatures. For example, a border of the display 18 may have a red, green, yellow, or blue tint when true white is being shown on all pixels 102 the display 18. Therefore, aperture ratios of pixels 102 within the portions 132, 134, and 136 may be adjusted to compensate for color variations that occur as a result of the temperature variations. For example, the aperture ratios of the pixels 102 may be adjusted so that when a solid color (e.g., black, white, blue, red, green, yellow, brown, purple, etc.) is shown on the display 18, the color will appear generally uniform across the entire display 18. In certain embodiments, adjusting the aperture ratios of the pixels 102 may only enable one color to appear uniform across the display 18. In the present embodiment, the aperture ratios are adjusted by adjusting a size of a black mask, or other light blocking layer, of the pixels 102 during manufacturing. However, it is contemplated that the aperture ratios may also be dynamically adjusted by sensing one or more temperatures during operation of the electronic device 10 and adjusting an adjustable light blocking layer of the pixels 102 during operation. It should be noted that in the present embodiment, the aperture ratios of the pixels 102 within the portions 132, 134, and 136 may be adjusted based on a thermal spatial distribution (e.g., thermal pattern) of the display 18 to overcome the effect that temperature differences in the display 18 have on the color produced by individual pixels 102.

Figure 7:
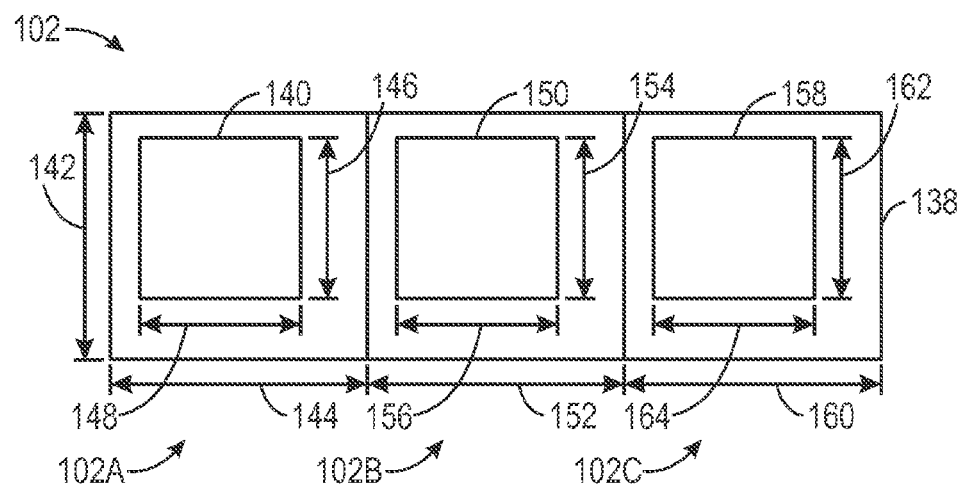
FIG. 7 is a block diagram illustrating pixel aperture ratios of subpixels of a pixel from a central portion of a display, in accordance with an embodiment.

Each of the pixels 102 may be formed from multiple subpixels (e.g., a red subpixel, a green subpixel, a blue subpixel, a white subpixel, etc.). FIG. 7 is a block diagram illustrating pixel aperture ratios of subpixels of the pixel 102 from the central portion 130 of the display 18 (e.g., the aperture ratios may be maximized). The pixel 102 includes the red subpixel 102A, the green subpixel 102B, and the blue subpixel 102C. As illustrated, the pixel 102 includes a material 138 that is used to block light from passing therethrough. As discussed previously, the material 138 may be part of the TFT layer 70, the liquid crystal layer 74, the color filter layer 76, the shielding layer 78, and/or the front polarizer 80, for example.

Apertures are formed in the material 138 to allow light to pass therethrough to display an image. For example, the subpixel 102A includes an aperture 140. The subpixel 102A has a length 142 and a width 144. The product of the length 142 and the width 144 determines a total area of the subpixel 102A ($TA_{102A}$). The aperture 140 of the subpixel 102A has a length 146 and a width 148. Accordingly, the area of the aperture 140 ($AA_{102A}$) is the product of the length 146 and the width 148. As may be appreciated, the aperture ratio of the subpixel 102A ($AR_{102A}$) is calculated by dividing the aperture 140 area by the total area of the subpixel 102A (e.g., $AR_{102A}=AA_{102A}/TA_{102A}$).

Furthermore, the subpixel 102B includes an aperture 150. The subpixel 102B has a length 142 and a width 152. The product of the length 142 and the width 152 determines a total area of the subpixel 102B ($TA_{102B}$). The aperture 150 of the subpixel 102B has a length 154 and a width 156. Accordingly, the area of the aperture 150 ($AA_{102B}$) is the product of the length 154 and the width 156. As may be appreciated, the aperture ratio of the subpixel 102B ($AR_{102B}$) is calculated by dividing the aperture 150 area by the total area of the subpixel 102B (e.g., $AR_{102B}=AA_{102B}/TA_{102B}$).

Moreover, the subpixel 102C includes an aperture 158. The subpixel 102C has a length 142 and a width 160. The product of the length 142 and the width 160 determines a total area of the subpixel 102C ($TA_{102C}$). The aperture 158 of the subpixel 102C has a length 162 and a width 164. Accordingly, the area of the aperture 158 ($AA_{102C}$) is the product of the length 162 and the width 164. As may be appreciated, the aperture ratio of the subpixel 102C ($AR_{102C}$) is calculated by dividing the aperture 158 area by the total area of the subpixel 102C (e.g., $AR_{102C}=AA_{102C}/TA_{102C}$).

As may be appreciated, in the illustrated embodiment the aperture ratios of the subpixels of the pixel 102 (e.g., $AR_{102A}$, $AR_{102B}$, $AR_{102C}$) may be the same (e.g., for pixels 102 in the central portion 130 of the display 18). However, in other embodiments, the aperture ratios of the subpixels of the pixels 102 may not be the same. Furthermore, the aperture ratios may be maximized to allow the greatest intensity of light to be produced. It should be noted that for producing a white color on the display, the following formula may be used: white=red+green+blue. However, if a full contribution of red, green, and blue does not result in sufficient white performance (e.g., in areas of the display 18 exposed to higher temperatures than the central portion 130 of the display), the contribution ratio of one or more of the red, green, and blue may be changed to achieve different (e.g., better) white color performance.

For example, if there is too much red, the contribution ratio of red may be reduced by a certain percentage A (e.g., white=A*red+green+blue, where A is greater than 0 and at a maximum 1). Moreover, if there is too much green, the contribution ratio of green may be reduced by a certain percentage B (e.g., white=red+B*green+blue, where B is greater than 0 and at a maximum 1). Furthermore, if there is too much blue, the contribution ratio of blue may be reduced by a certain percentage C (e.g., white=red+green+C*blue, where C is greater than 0 and at a maximum 1). As may be appreciated, any combination of contribution percentages A, B, and C may be used (e.g., white=A*red+B*green+C*blue, where A, B, and C are greater than 0 and at a maximum 1).

Figure 8:
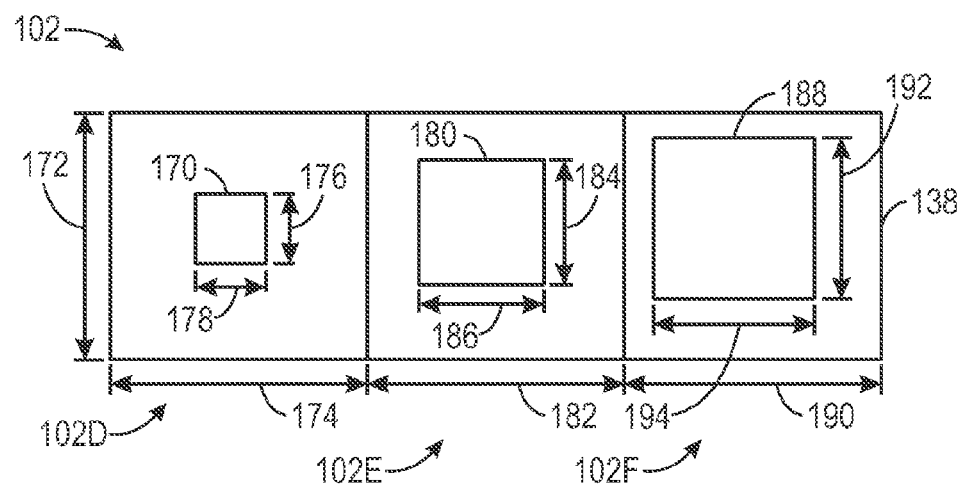
FIG. 8 is a block diagram illustrating pixel aperture ratios of subpixels of a pixel from a border portion of a display, in accordance with an embodiment.

Accordingly, the pixels 102 may have subpixels with apertures that are designed to change the contribution ratio of red, green, and/or blue to improve color performance (e.g., for displaying white). FIG. 8 is a block diagram illustrating pixel aperture ratios of subpixels of the pixels 102 from a border portion (e.g., portions 132, 134, 136) of the display 18. The pixel 102 includes the red subpixel 102D, the green subpixel 102E, and the blue subpixel 102F. Apertures are formed in the material 138 to allow light to pass therethrough to display an image. For example, the subpixel 102D includes an aperture 170. The subpixel 102D has a length 172 and a width 174. The product of the length 172 and the width 174 determines a total area of the subpixel 102D ($TA_{102D}$). The aperture 170 of the subpixel 102D has a length 176 and a width 178. Accordingly, the area of the aperture 170 ($AA_{102D}$) is the product of the length 176 and the width 178. As may be appreciated, the aperture ratio of the subpixel 102D ($AR_{102D}$) is calculated by dividing the aperture 170 area by the total area of the subpixel 102D (e.g., $AR_{102D}=AA_{102D}/TA_{102D}$).

Furthermore, the subpixel 102E includes an aperture 180. The subpixel 102E has a length 172 and a width 182. The product of the length 172 and the width 182 determines a total area of the subpixel 102E ($TA_{102E}$). The aperture 180 of the subpixel 102E has a length 184 and a width 186. Accordingly, the area of the aperture 180 ($AA_{102E}$) is the product of the length 184 and the width 186. As may be appreciated, the aperture ratio of the subpixel 102E ($AR_{102E}$) is calculated by dividing the aperture 180 area by the total area of the subpixel 102E (e.g., $AR_{102E}=AA_{102E}/TA_{102E}$).

Moreover, the subpixel 102F includes an aperture 188. The subpixel 102F has a length 172 and a width 190. The product of the length 172 and the width 190 determines a total area of the subpixel 102F ($TA_{102F}$). The aperture 188 of the subpixel 102F has a length 192 and a width 194. Accordingly, the area of the aperture 188 ($AA_{102F}$) is the product of the length 192 and the width 194. As may be appreciated, the aperture ratio of the subpixel 102F ($AR_{102F}$) is calculated by dividing the aperture 188 area by the total area of the subpixel 102F (e.g., $AR_{102F}=AA_{102F}/TA_{102F}$).

As may be appreciated, in the illustrated embodiment one or more of the aperture ratios of the subpixels of a pixel 102 (e.g., $AR_{102D}$, $AR_{102E}$, $AR_{102F}$) from the border portion of the display 18 is smaller than a respective aperture ratio of the subpixels of a pixel 102 (e.g., $AR_{102A}$, $AR_{102B}$, $AR_{102C}$) from the central portion 130 of the display 18. In certain embodiments, a sum of the aperture ratios of the subpixels of a pixel 102 (e.g., $AR_{102D}$, $AR_{102E}$, $AR_{102F}$) from the border portion of the display 18 is smaller than a sum of the aperture ratios of the subpixels of a pixel 102 (e.g., $AR_{102A}$, $AR_{102B}$, $AR_{102C}$) from the central portion 130 of the display 18. It should be noted that as the aperture ratios of the subpixels of the pixels 102 are reduced, the intensity of light produced by the pixels 102 may decrease.

As previously discussed, to produce a white color on the display, the following formula may be used: white=A*red+B*green+C*blue, where A, B, and C are greater than 0 and at a maximum 1. It should be noted that the contribution factors A, B, and C may be calculated using the following formulas: $A=AR_{102D}/AR_{102A}$, $B=AR_{102E}/AR_{102B}$, and $C=AR_{102F}/AR_{102C}$. Furthermore, if the contribution factors A, B, and C are known, and the aperture ratios of a central portion of the display 18 are known (e.g., $AR_{102A}$, $AR_{102B}$, $AR_{102C}$), then the aperture ratios for a border portion of the display 18 (e.g., $AR_{102D}$, $AR_{102E}$, $AR_{102F}$) may be calculated.

Although the apertures 170, 180, and 188 are illustrated as having different lengths and/or widths, the apertures 170, 180, and 188 may all have the same lengths and/or widths. Furthermore, while the total area of each of the subpixels 102D, 102E, and 102F may generally be the same, the area of the apertures 170, 180, and 188 may be the same with respect to each other, or they may be different with respect to each other. For example, the area of the aperture 170 may be greater than the area of the aperture 180 and/or the area of the aperture 188. In addition, the area of the aperture 180 may be greater than the area of the aperture 170 and/or the area of the aperture 188. Moreover, the area of the aperture 188 may be greater than the area of the aperture 170 and/or the area of the aperture 180.

The size that the apertures 170, 180, and 188 should be to improve image quality may be determined using any suitable method. For example, the size that the apertures 170, 180, and 188 should be may be determined using experimentation (e.g., such as by choosing sizes of the apertures 170, 180, and 188, visually inspecting a display, and altering the sizes of the apertures 170, 180, and 188 based on the visual inspection) and/or mathematically (e.g., determining an amount of an excess color and calculating sizes of the apertures 170, 180, and 188 to reduce the excess color).

Figure 9:
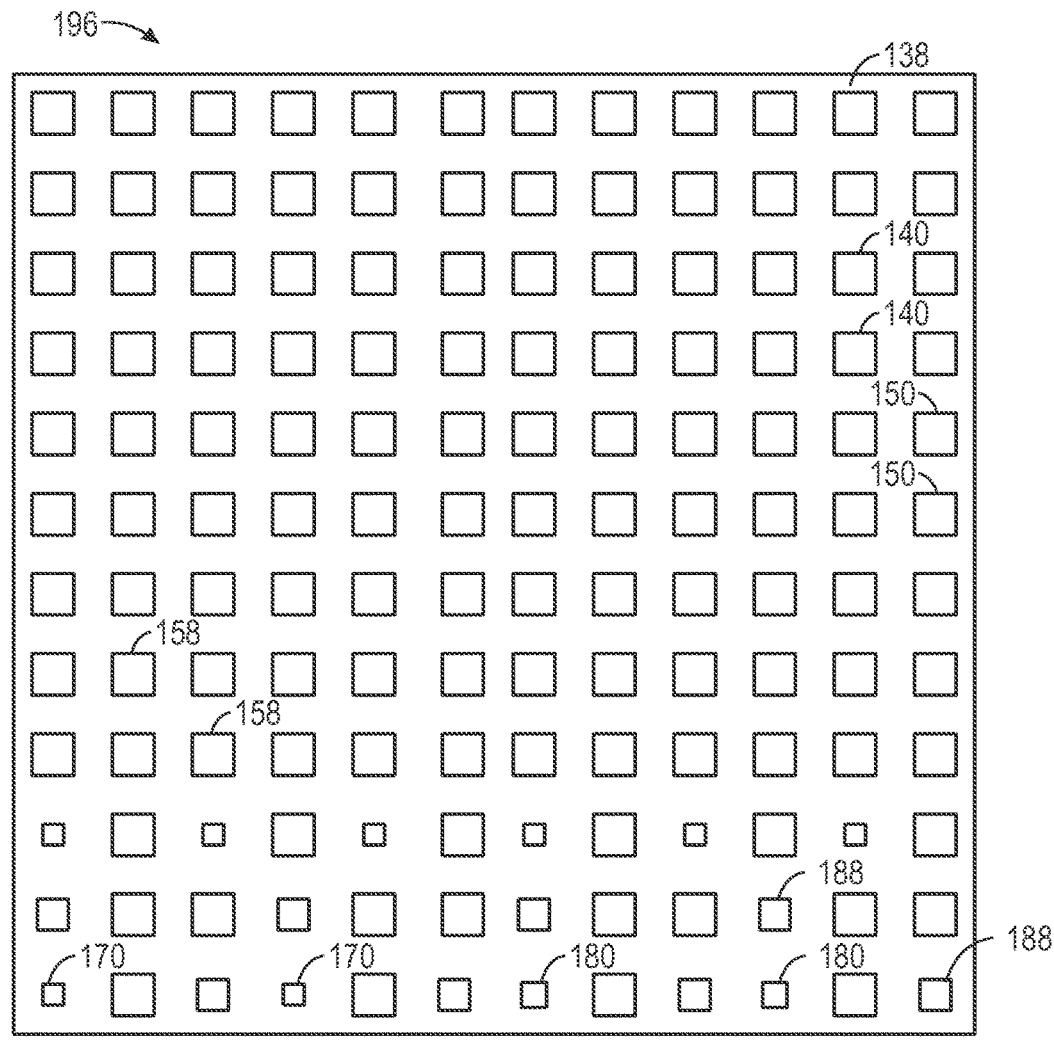
FIG. 9 is a top view of a layer of a display used to form different aperture ratios, in accordance with an embodiment.

The different aperture ratios may be formed by the materials of the display 18 using any suitable combination of materials. Accordingly, FIG. 9 is a top view of a layer 196 of the display 18 used to form different aperture ratios. The layer 196 is formed using the material 138. As discussed above, the material 138 may be any suitable material for blocking the transmission of light therethrough. For example, the material 138 may be part of the TFT layer 70, the liquid crystal layer 74, the color filter layer 76, the shielding layer 78, and/or the front polarizer 80. Furthermore, the material 138 may be a black mask, a metallic layer, a limited transparency layer, and so forth. As may be appreciated, the apertures 140, 150, 158, 170, 180, and 188 having different aperture ratios may be formed using any suitable method. For example, the apertures 140, 150, 158, 170, 180, and 188 may be formed in the material 138 by etching, photolithography, and so forth. Although FIG. 9 is described as being a layer 196 of the display 18, in certain embodiments, the material 138 may be a material used to form a pattern used to form a layer of the display 18.

Figure 10:
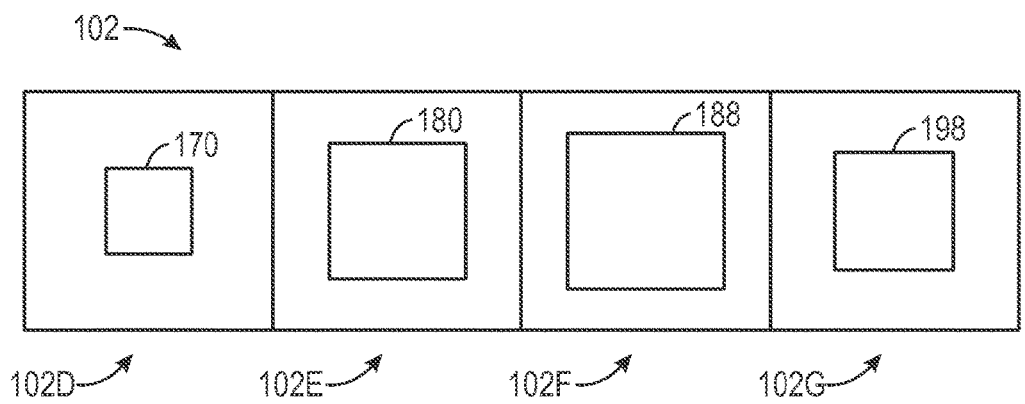
FIG. 10 is a block diagram illustrating a pixel having four subpixels that may have different aperture ratios, in accordance with an embodiment.

In certain embodiments, the pixels 102 may include more than three subpixels. FIG. 10 illustrates one embodiments of a pixel 102 having four subpixels. Specifically, the pixel 102 includes the red subpixel 102D, the green subpixel 102E, the blue subpixel 102F, and a white subpixel 102G. The red subpixel 102D has the aperture 170 and an aperture ratio $AR_{102D}$. Moreover, the green subpixel 102E has the aperture 180 and an aperture ratio $AR_{102E}$. Furthermore, the blue subpixel 102F has the aperture 188 and an aperture ratio $AR_{102F}$. The white subpixel 102G has an aperture 198 and an aperture ratio $AR_{102G}$. As may be appreciated, the aperture ratios (e.g., $AR_{102D}$, $AR_{102E}$, $AR_{102F}$, $AR_{102G}$) may be adjusted by changing the size of the apertures 170, 180, 188, and 198. The aperture ratios may be configured to limit the effects of heat producing components of an electronic device 10, as described above. In certain embodiments, the white subpixels 102G may be used to show a white color on the display 18. In such embodiments, the white color may be distorted (e.g., near the border of the display 18, near heat producing electronics, and so forth). Accordingly, the size of the aperture 198 may be adjusted to reduce the effects of the white color distortion. It should be noted that the arrangement of the subpixels of pixels 102 may be any suitable arrangement (e.g., row, box, column, etc.)

Figure 11:
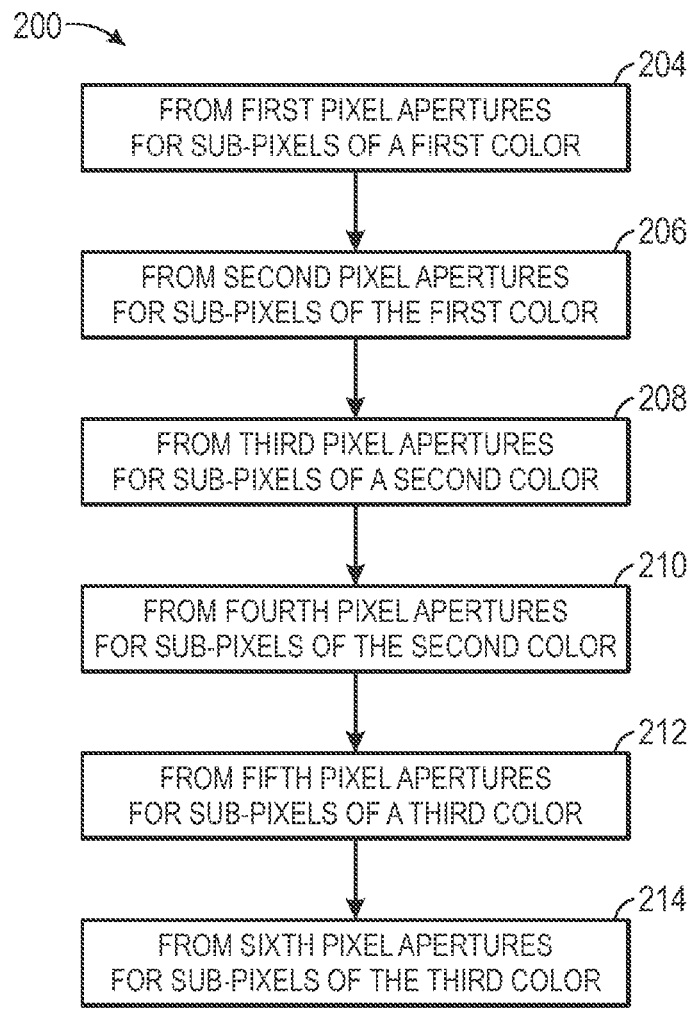
FIG. 11 is a flowchart describing a method for forming a display panel with pixels having different aperture ratios, in accordance with an embodiment.

As discussed above, the different aperture ratios may be formed using any suitable method. For example, FIG. 11 is a flowchart describing a method 200 for forming the display panel 62 with pixels 102 having different aperture ratios. At a block 204, a first set of pixel 102 apertures for subpixels of a first color (e.g., red, green, blue, white) are formed in the layer of material 138 (e.g., black mask). For example, the first set of pixel 102 apertures may be formed in the central section 130 of the display 18. Furthermore, a second set of pixel 102 apertures for subpixels of the first color (e.g., red, green, blue, white) are formed in the layer of material 138 in a section of the material 138 configured to be disposed near heat producing electronics (block 206). For example, the second set of pixel 102 apertures may be formed in one of the border sections 132, 134, and 136 of the display 18. Each of the second set of pixel 102 apertures is configured to have a smaller area than each of the first set of pixel 102 apertures to decrease the effect that the heat producing electronics have on displayed images.

A third set of pixel 102 apertures for subpixels of a second color (e.g., red, green, blue, white) are formed in the layer of material 138 (block 208). For example, the third set of pixel 102 apertures may be formed in the central section 130 of the display 18. Moreover, a fourth set of pixel 102 apertures for subpixels of the second color (e.g., red, green, blue, white) are formed in the layer of material 138 in the section of the material 138 configured to be disposed near heat producing electronics (block 210). For example, the fourth set of pixel 102 apertures may be formed in one of the border sections 132, 134, and 136 of the display 18. Each of the fourth set of pixel 102 apertures is configured to have a smaller area than each of the third set of pixel 102 apertures to decrease the effect that the heat producing electronics have on displayed images.

At block 212, a fifth set of pixel 102 apertures for subpixels of a third color (e.g., red, green, blue, white) are formed in the layer of material 138. For example, the fifth set of pixel 102 apertures may be formed in the central section 130 of the display 18. Furthermore, a sixth set of pixel 102 apertures for subpixels of the third color (e.g., red, green, blue, white) are formed in the layer of material 138 in the section of the material 138 configured to be disposed near heat producing electronics (block 214). For example, the sixth set of pixel 102 apertures may be formed in one of the border sections 132, 134, and 136 of the display 18. Each of the sixth set of pixel 102 apertures is configured to have a smaller area than each of the fifth set of pixel 102 apertures to decrease the effect that the heat producing electronics have on displayed images. Accordingly, pixel apertures of different sizes may be formed in the layer of material 138. It should be noted that although the method 200 includes blocks 202 through 214, in certain embodiments, fewer or more blocks may be part of the method 200. For example, in some embodiments, the method 200 may include only blocks 202 through 206.

Figure 12:
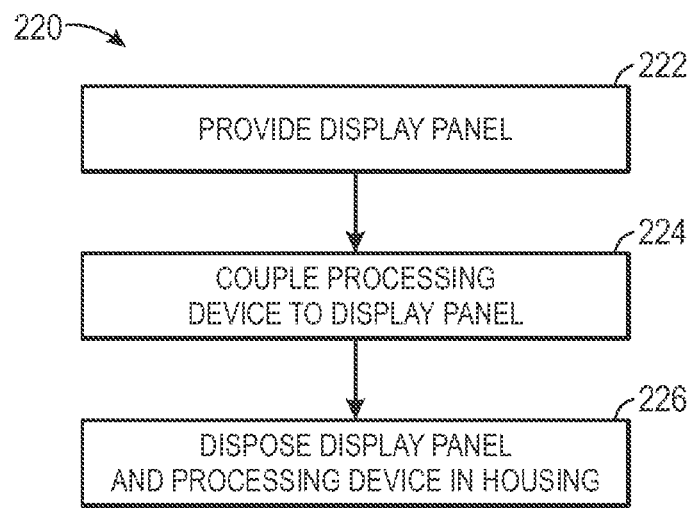
FIG. 12 is a flowchart describing a method for manufacturing a consumer electronic device having a display with pixels having different aperture ratios, in accordance with an embodiment.

A consumer electronic device 10 may be manufactured with a display panel 62 having different sized pixel apertures. Accordingly, FIG. 12 is a flowchart describing a method 220 for manufacturing such a consumer electronic device 10. A display panel 62 may be provided (block 222). The display panel 62 may include multiple display pixels 102 arranged in rows and columns. Furthermore, the display pixels 102 may include a first set of subpixels disposed in a first section of the display panel 62 and a second set of subpixels disposed in a second section of the display panel 62. The first set of subpixels may each have a first pixel aperture. Moreover, the second set of subpixels may each have pixel apertures that are smaller than the first pixel aperture. The second section of the display panel 62 is configured to be exposed to greater heat than the first section of the display panel 62. Furthermore, the pixel apertures of the second set of subpixels are sized to compensate for color offsets due to greater heat applied to the second section of the display panel 62. A processor 12 (e.g., processing device) may be coupled to the display panel 62 (block 224). Furthermore, the display panel 62 and the processor 12 may be disposed in a housing 32 (block 226). Accordingly, an electronic device 10 may be manufactured to have a display 18 with pixels 102 having pixel apertures of different sizes. With the different pixel aperture sizes, image color variations produced by temperature differences in the display 18 may be reduced.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display of an electronic device comprising:
a first pixel section having a first plurality of pixels, wherein each pixel of the first plurality of pixels consists essentially of a first red subpixel having a first aperture ratio, a first green subpixel having a second aperture ratio, and a first blue subpixel having a third aperture ratio; and
a second pixel section having a second plurality of pixels, wherein each pixel of the second plurality of pixels consists essentially of a second red subpixel having a fourth aperture ratio, a second green subpixel having a fifth aperture ratio, and a second blue subpixel having a sixth aperture ratio, wherein the second pixel section is disposed nearer to a heat producing component of the electronic device than the first pixel section, and the heat producing component causes the second pixel section to operate at a greater temperature than the first pixel section;
wherein the first aperture ratio is greater than the fourth aperture ratio, the second aperture ratio is greater than the fifth aperture ratio, and the third aperture ratio is greater than the sixth aperture ratio.

2. The display of claim 1, wherein a first sum comprises the first aperture ratio, the second aperture ratio, and the third aperture ratio and a second sum comprises the fourth aperture ratio, the fifth aperture ratio, and the sixth aperture ratio, and wherein the first sum is greater than the second sum.

3. The display of claim 1, wherein the heat producing component comprises a processor, a power supply, or a battery, or any combination thereof.

4. The display of claim 1, wherein the first pixel section comprises a central portion of the display and the second pixel section comprises a border portion of the display.

5. The display of claim 1, comprising a third pixel section having a third plurality of pixels, wherein each of the third plurality of pixels consists essentially of a third red subpixel having a seventh aperture ratio, a third green subpixel having a eighth aperture ratio, and a third blue subpixel having a ninth aperture ratio, and wherein the first aperture ratio is greater than the seventh aperture ratio, the second aperture ratio is greater than the eighth aperture ratio, and the third aperture ratio is greater than the ninth aperture ratio, wherein the third pixel section is disposed nearer to the heat producing component of the electronic device than the first pixel section and the second pixel section and the heat producing component causes the third pixel section to operate at a greater temperature than the first pixel section and the second pixel section.

6. The display of claim 1, comprising a black mask configured to form apertures corresponding to the first aperture ratio, the second aperture ratio, the third aperture ratio, the fourth aperture ratio, the fifth aperture ratio, and the sixth aperture ratio.

7. The display of claim 1, comprising a thin-film transistor layer configured to form apertures corresponding to the first aperture ratio, the second aperture ratio, the third aperture ratio, the fourth aperture ratio, the fifth aperture ratio, and the sixth aperture ratio.

8. The display of claim 1, wherein each pixel of the first plurality of pixels comprises a first white subpixel having a seventh aperture ratio and each pixel of the second plurality of pixels comprises a second white subpixel having an eighth aperture ratio, and wherein the seventh aperture ratio is greater than the eighth aperture ratio.

9. The display of claim 1, wherein the intensity of light produced by the first pixel section is greater than the intensity of light produced by the second pixel section.

10. The display of claim 1, wherein each ratio of the first aperture ratio, the second aperture ratio, the third aperture ratio, the fourth aperture ratio, the fifth aperture ratio, and the sixth aperture ratio is greater than 0 and less than 1.

11. A method of manufacturing a consumer electronic device, comprising:
providing a display device, wherein the display device comprises:
a plurality of subpixels disposed across the display device in a first portion and a second portion, wherein the second portion is nearer to a heat generating component than the first portion, each subpixel comprises an aperture ratio, and the plurality of subpixels comprises first color subpixels having a first color, second color subpixels having a second color, and third color subpixels having a third color,
wherein the aperture ratios of the first color subpixels in the second portion are less than the aperture ratios of the first color subpixels in the first portion, and the aperture ratios of the second color subpixels in the second portion are equal to the aperture ratios of the second color subpixels in the first portion; and
coupling a processing device to the display device.

12. The method of claim 11, comprising disposing the display device and the processing device in a housing.

13. A display device comprising:
a plurality of subpixels disposed across the display device in a first portion and a second portion, wherein the second portion is nearer to a heat generating component than the first portion, each subpixel comprises an aperture ratio, and the plurality of subpixels comprises first color subpixels having a first color, second color subpixels having a second color, and third color subpixels having a third color,
wherein the aperture ratios of the first color subpixels in the second portion are less than the aperture ratios of the first color subpixels in the first portion, and the aperture ratios of the second color subpixels in the second portion are equal to the aperture ratios of the second color subpixels in the first portion.

14. The display device of claim 13, wherein the second portion comprises a border portion of the display device.

15. An electronic device comprising:
a display device comprising:
a plurality of subpixels disposed across the display device in a first portion and a second portion, wherein the second portion is nearer to a heat generating component than the first portion, each subpixel comprises an aperture ratio, and the plurality of subpixels comprises first color subpixels having a first color, second color subpixels having a second color, and third color subpixels having a third color,
wherein the aperture ratios of the first color subpixels in the second portion are less than the aperture ratios of the first color subpixels in the first portion, and the aperture ratios of the second color subpixels in the second portion are equal to the aperture ratios of the second color subpixels in the first portion; and a liquid crystal display (LCD) panel comprising the plurality of subpixels arranged in rows and columns, wherein the first portion comprises a first section of the LCD panel, the second portion comprises a second section of the LCD panel, wherein the second section of the LCD panel operates at greater temperatures than the first section of the LCD panel; and wherein the aperture ratios of the first color subpixels in the second portion are sized based at least in part on proximity to the heat generating component.

16. The electronic device of claim 15, wherein the plurality of subpixels includes a red subpixel, a green subpixel, a blue subpixel, and a white subpixel.

\* \* \* \* \*